United States Patent
Pedro

(10) Patent No.: US 6,515,224 B1
(45) Date of Patent: Feb. 4, 2003

(54) CASCADING CABLE TRAY SYSTEM WITH PRE-FABRICATED SUPPORT STRUCTURE

(75) Inventor: John M. Pedro, Mountain View, CA (US)

(73) Assignee: Equinix, Inc., Mountain View, CA (US)

( * ) Notice: Subject to any disclaimer, the term of this patent is extended or adjusted under 35 U.S.C. 154(b) by 0 days.

(21) Appl. No.: 09/905,631

(22) Filed: Jul. 13, 2001

Related U.S. Application Data

(63) Continuation-in-part of application No. 09/718,612, filed on Nov. 21, 2000, now abandoned.

(51) Int. Cl.[7] ................................................. H02G 7/00
(52) U.S. Cl. .................. 174/48; 52/220.7; 211/126.9; 211/133.5; 108/181; 361/826
(58) Field of Search ........................... 174/48, 95, 101; 361/826; 52/36.1, 220.7, 243.1; 211/88.02, 126.1, 126.8, 126.9, 133.5, 153; 108/60, 61, 110, 158.12, 158.13, 181, 108, 50

(56) References Cited

U.S. PATENT DOCUMENTS

| | | | |
|---|---|---|---|
| 3,781,567 A | 12/1973 | Papsco | |
| 4,127,072 A | * 11/1978 | LePon | 108/157.13 |
| 4,320,261 A | 3/1982 | Scerbo et al. | |
| 4,558,647 A | * 12/1985 | Petersen | 108/107 |
| 4,641,754 A | 2/1987 | Hebel et al. | |
| 4,665,546 A | 5/1987 | Brey et al. | |
| 5,036,778 A | * 8/1991 | Briosi | 108/110 |
| 5,114,024 A | * 5/1992 | Meissner | 211/162 |
| 5,718,343 A | * 2/1998 | Belokin et al. | 211/118 |
| 5,969,292 A | 10/1999 | Snider, Jr. et al. | |
| 6,138,583 A | * 10/2000 | Mahone et al. | 108/108 |
| 6,223,909 B1 | 5/2001 | Mendoza | |
| 6,246,004 B1 | 6/2001 | Faccin | |
| 6,286,275 B1 | 9/2001 | Edwards | |
| 6,286,691 B1 | * 9/2001 | Oberhaus et al. | 211/113 |
| 6,322,176 B1 | 11/2001 | Wild | |
| 6,409,031 B1 | * 6/2002 | Wynne | 108/181 |

* cited by examiner

Primary Examiner—Dean A. Reichard
Assistant Examiner—Adolfo Nino
(74) Attorney, Agent, or Firm—Blakely, Sokoloff, Taylor & Zafman LLP

(57) ABSTRACT

A cascading cable tray system is mounted on a pre-fabricated support structure suspended from the ceiling of an Internet co-location facility. The cable trays are segregated by security, power, and data transmission functions and occupy varying horizontal planes.

25 Claims, 9 Drawing Sheets

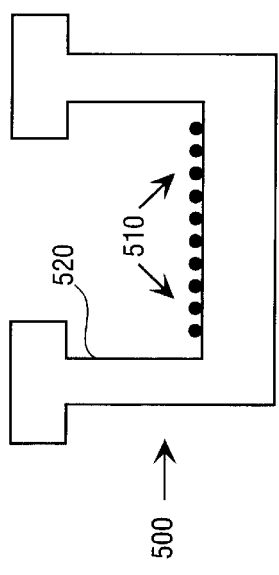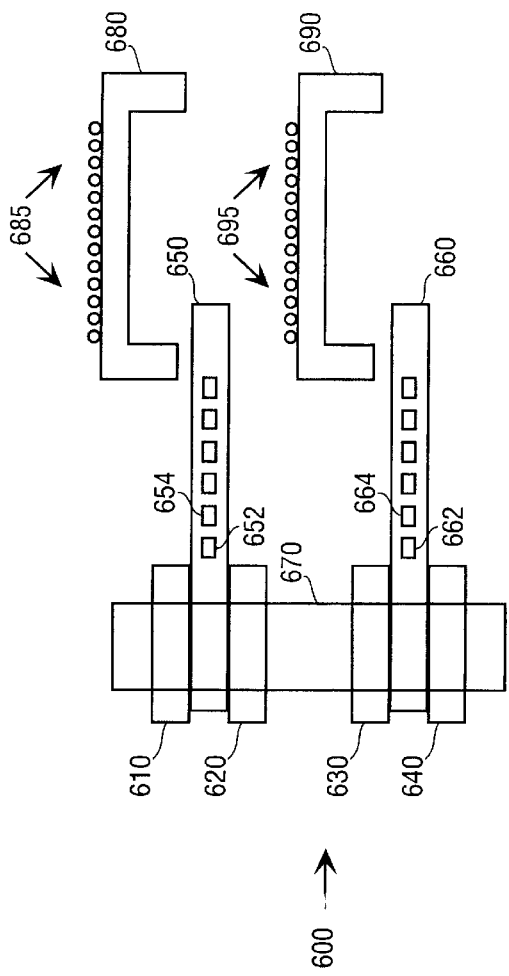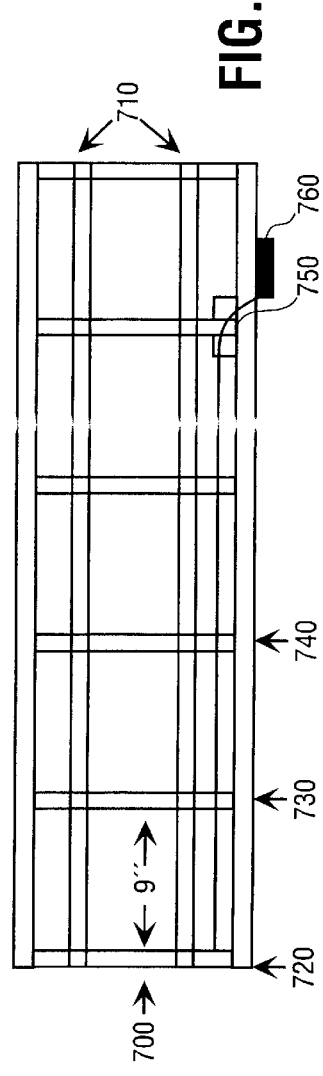

CASCADING CABLE TRAY SYSTEM WITH PRE-FABRICATED SUPPORT STRUCTURE

This is a continuation in part of application Ser. No. 09/718,612 filed Nov. 21, 2000, now abandoned.

FIELD OF THE INVENTION

The present invention relates generally to a cable tray distribution system and, more particularly, to an overhead cable tray system with a pre-fabricated support structure for an Internet co-location facility.

BACKGROUND

In an Internet co-location facility, multiple cabinets configured for networking and/or server co-location are typically arranged in rows separated by circulation aisles. Cabling to and from cabinets is necessary for a wide variety of purposes, including electronic message transmission, delivering of services, connecting to private Wide Area Networks (WAN's) and Internet Service Providers (ISPs), and to provide the power necessary to run various types of equipment.

The cables themselves are most often routed in a cable tray system either below the floor or through overhead raceways. A cable tray system is an assembly of units or sections and associated fittings forming a rigid structural system used to support cables in accordance to their respective installation requirements. The cables may be secured to stable bottom trays or on multiple rungs which span the side rails and provide a plane on which the cables may be mounted. Most systems are configured to drop, turn, rise, and intersect through the structures in which they are routed.

There are numerous shortcomings with prior cable tray systems. For one, with the increasing number of services that are being provided to members of Internet co-location facilities, the ability to access cables in these systems (e.g., to make repairs in a timely fashion, conduct routine maintenance, install new cables, replace cables, etc.) has become increasingly complex. The cables in these systems are often a tangled mess, making it difficult to reach and identify the appropriate cable. Moreover, the cables are often not segregated by function (e.g., data transmission, power, fiber optics services, etc.) which can interfere with electrical and optical performance. For example, data transmission cables typically operate on a lower voltage than power transmission cables. If these cables cross, the power cables may interfere with the data transmission cables causing outages in the Internet co-location facility. Copper cables may also damage fiber optic cables when installed in the same tray, as fiber optic cabling has very strict bending radius and loading restrictions.

Another disadvantage of prior art cable tray systems in Internet co-location facilities, is that the cable trays themselves have typically been bolted directly to the cabinets housing the co-located member's equipment. Thus, when one or more cabinets need to be moved it is necessary to unbolt the cable trays from the cabinets, thus causing an inconvenience in the operation of the facility. Alternatively, if it is necessary to move the cable trays, the co-located members are affected (i.e., with potential disruptions in power or other services provided by the cables in these facilities). In those facilities with raised floor cabling systems (i.e., with cables running underneath the facility itself), there are also limitations. For instance, the floors in these systems are generally opaque. This makes maintaining or repairing the cables difficult, because they are hard to see. It also creates potential security problems, as one co-located member's cables may be accessible to other co-located members of the facility.

SUMMARY

One embodiment of the present invention provides for a cascading cable tray system with a pre-fabricated support structure for an Internet co-location facility. The system is designed to segregate cable trays by function (i.e., security, power, and fiberoptic and copper data) and to be readily accessible to system users.

According to one embodiment, there is provided a pre-fabricated grid structure formed of intersecting bendable metal rods to mount a series of cable trays occupying varying horizontal planes. The cable trays provide raceways for security, power, and telecommunication cables. Mounted to a top corner portion of the grid structure is a security cable tray for routing security cables to member sites in the grid structure and also to security equipment within the facility. Suspended from a top center portion of the grid structure is a cable ladder assembly providing raceways for DC and AC power cables to provide power to the member sites. Mounted on a metal rod affixed to opposing sides of the grid structure and spanning the width of the grid structure below the cable ladder assembly are data transmission cable trays. One of these trays is a whale-bone shaped cable tray comprised of a spine and metal ribs for routing copper data transmission cables. The other cable tray is a bucket-shaped cable tray for routing fiber optics cables.

According to another embodiment, two additional telecommunications fiber feeder cable trays may be mounted to a top center portion of the grid structure. The telecommunications fiber feeder cable trays are designed for grid structures that house telecommunications equipment to connect the facility to the outside world. In this embodiment, the telecommunications fiber feeder cable trays occupy the highest horizontal plane in the cable tray system.

The cable trays are modular and are designed to reside above the cabinets. In addition, the cable tray system is routed throughout the remainder of the facility (i.e., over the aisles of the facility) using the grid structure. However, instead of forming a housing for the cabinets and the telecommunications equipment, the grid structure is suspended from the ceiling in a trapeze configuration using multiple threaded rods.

BRIEF DESCRIPTION OF THE DRAWINGS

The present invention is illustrated by way of example, and not limitation, in the figures of the accompanying drawings in which like reference numerals refer to similar elements and which:

FIG. 5 is an exploded view of a security cable tray in accordance with one embodiment of the present invention.

FIG. 6 is an exploded view of a cable ladder assembly in accordance with one embodiment of the present invention.

FIG. 7 is a top view of an AC cable tray in accordance with one embodiment of the present invention.

DETAILED DESCRIPTION

Described herein is a cascading cable tray system with a pre-fabricated support structure. Although well-suited for use in an Internet co-location facility, the cable tray system with the pre-fabricated support structure described below may also be used for other applications, such as in telecommunication facilities, data processing rooms, and other types of electronic equipment rooms where an overhead cable tray system may be necessary. Accordingly, the specification and drawings are to be regarded in an illustrative, rather than a restrictive, sense.

One limitation of cable tray systems of the past is that cable trays for different types of services have not been clearly segregated, resulting in congestion, electrical failure, and various other problems. Moreover, prior cable tray systems have often not been easily accessible to technicians, system users, and other individuals who have needed to access cables to make repairs, conduct routine maintenance, and the like. It would be helpful if a cable tray system existed that was clearly segregated and easily accessible. One application in which this would be useful is in an Internet co-location facility where turnaround time for routine services, maintenance, and repairs is critical and could mean the difference between making and breaking a deal for businesses who depend on the proper functioning of their web sites.

A segregated and easily accessible cable tray system and a pre-fabricated support structure for the system would prove useful in numerous other applications as well.

Figure 1:
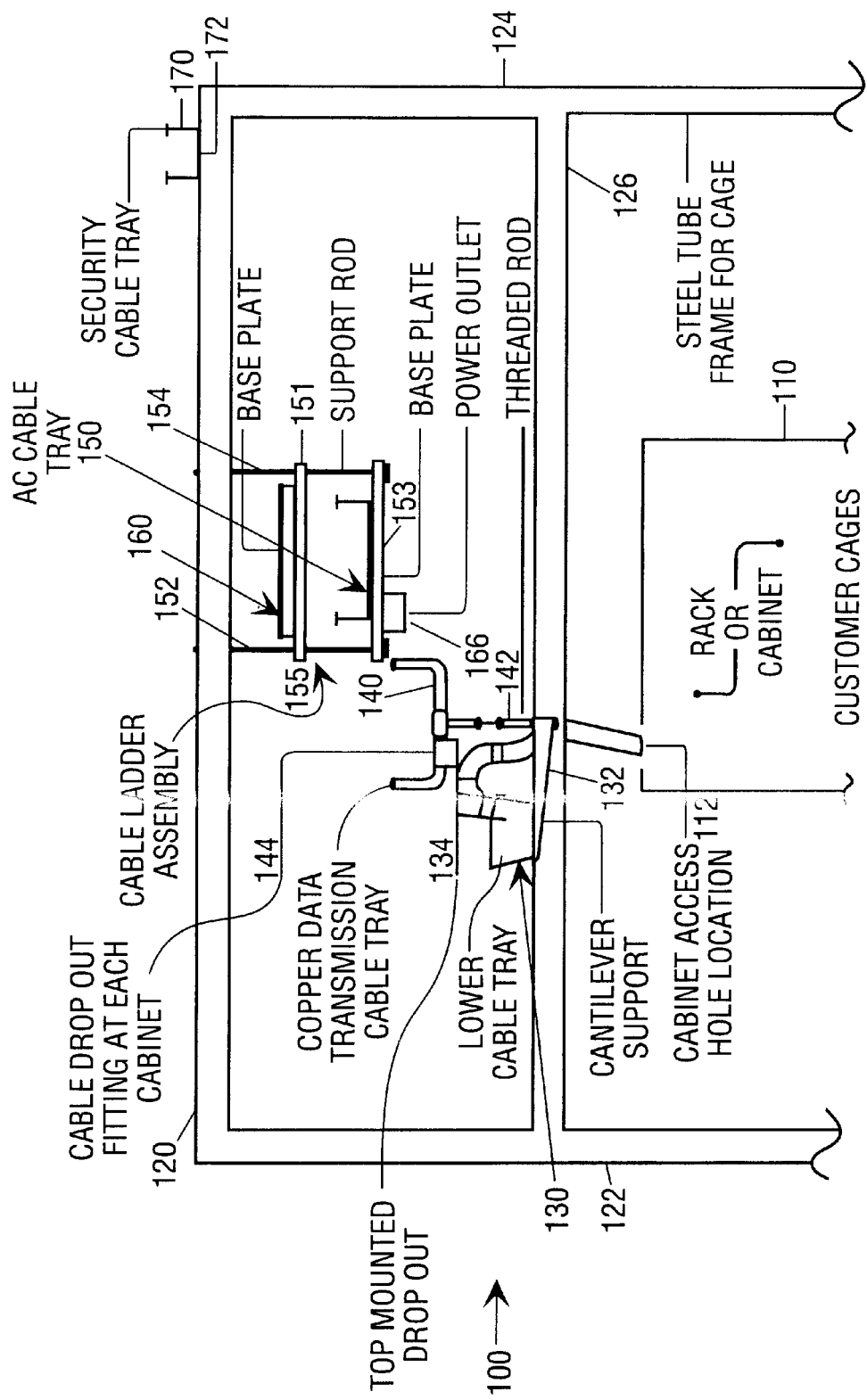
FIG. 1 is a side view of a cable tray system in an Internet co-location facility in accordance with one embodiment of the present invention.

Referring now to FIG. 1, there is shown a side view of a cable tray system 100 in an Internet co-location facility in accordance with one embodiment of the present invention. A typical Internet co-location facility (not shown in this view) comprises a plurality of cabinets located in shared or private grid structures. Each cabinet is located in an enclosed frame into which equipment may be mounted. For instance, each cabinet may be designed to house Internet access units comprising an information processing apparatus (such as a personal computer), a conventional terminal, or some other type of computer terminal containing a communication line interface for connecting to the Internet in a manner well known by those skilled in the art of computer programming.

In the embodiment of the invention represented by FIG. 1, cabinet 110 houses an Internet access unit including an information processing apparatus and various other types of electrical equipment (not shown in this view). Cabinet 110 may be housed in a grid structure 120 (i.e., a cage) formed of intersecting bendable metal rods supported by a rectangular or square frame. The most common installation of the grid structure 120 is a back-to-back configuration with multiple other grid structures (not shown in this view), thereby housing hundreds (if not thousands) of cabinets. Although only one cabinet 110 is shown in the embodiment represented by FIG. 1, it should be noted that the cable tray system 100 may serve multiple cabinets (not shown in this view) located in the grid structure 120.

Suitable materials for the grid structure 120 (and also for cable trays 140, 150, 160, and 170) are mainly structural steel or aluminum alloys thereof. Of course, other materials may be used as well. All elements of the grid structure frame including vertical support members 122 and 124 and horizontal support member 126 may be formed from steel tubing (e.g., similar to the type commonly available for piping such as plumbing piping). Attached to the vertical support members 122 and 124 is the horizontal support member 126 which spans the width of the grid structure 120 above the cabinet 110. In addition to providing support for the grid structure 120, the horizontal support member 126 also provides a surface on which to mount cable trays 130 and 140 in a manner that will be described in detail below. In the preferred embodiment, the vertical support members 122 and 124 are approximately 10 feet 6 inches, and the horizontal support member 126 is 10 feet 8 inches, although these dimensions are flexible. It should also be noted that while the grid structure 120 is shown in the embodiment illustrated by FIG. 1, it should be kept in mind that the cable tray system 100 of the present invention may be used equally well with a variety of support structures including metal and wood beams, wood ceilings, and other like building structures.

The cable tray system 100 is designed to provide overhead cable trays for security, power, and telecommunications cables and other cables that may be needed in an Internet co-location facility or other facility where it would be helpful to employ the cable tray system 100. Mounted to a top portion of the grid structure 120 is a security cable tray 170 for routing security cables (not shown in this view) to the cabinet 110 and also to security equipment (not shown in this view) within the facility. The security cable tray 170 (and all other cable trays in the cable tray system 100) may be mounted to the grid structure 120 using an anchor bolt or similar type of fastening device (not shown in this view) which extends through an aperture in the base plate 172 of the security cable tray 170 and fastens to a top portion of the grid structure 120. The security cable tray 170 has a solid trough bottom so as to prevent individuals from reaching up and tampering with the security cables. Security cables run through the vertical support member 124 (i.e., steel tubing) to security devices (not shown in this view) in the grid structure 120 including a biometric reader, alarms, lighting, and an electric strike for the grid structure door which opens upon proper use of the biometric reader. In addition, the security cable tray 170 provides an overhead raceway (See FIGS. 2 and 4) to route security cables between the grid structure 120 and a security equipment room (not shown in this view) within the facility.

Suspended from a top center portion of the grid structure 120 by threaded rods 152 and 154 and extending into the interior of the grid structure 120 itself is a cable ladder assembly 155 which provides raceways for DC and AC power cables (not shown in this view). The cable ladder assembly 155 is essentially a trapeze configuration with the threaded rods 152 and 154 secured to an upper base plate 151 and to a lower base plate 153 held in parallel to one another using fasteners such as nuts and bolts (not shown in this view). Cable trays 160 and 150 are also secured to base plates 151 and 153 using any one of a variety of fastening techniques in a manner well known in the art. In the preferred embodiment, the base plates 151 and 153 are manufactured by Unistrut Corporation, but any type of base plates which provide a surface on which to mount cable trays 160 and 150 may be used.

The DC cable tray 160 in the cable ladder assembly 155 may be used for DC cables (not shown in this view) to provide DC power distribution to cabinet 110. The DC cables drop to the cabinet 110 through an opening (not shown in this view) in the DC cable tray 160. The AC cable tray 150 in the cable ladder assembly 155 sits below the DC cable tray 160 and may be used for AC cables (not shown in this view) to provide AC power distribution to the cabinet 110. Additional threaded rods 162 and 164 may be suspended from the upper base plate 151 to support the AC cable tray 150. A power outlet 166 may be affixed to the bottom of the AC cable tray 150. The AC cables drop into the power outlet 166 through an opening (not shown in this view) in the base plate 153 of the AC cable tray 150. The DC and AC cable trays 160 and 150 are routed from the grid structure 120 to a power distribution center in the facility using overhead raceways (See FIGS. 2 and 4).

Mounted on the horizontal support member 126 below the cable ladder assembly 155 are data transmission cable trays 140 and 130 to route data transmission cables (not shown in this view) to the cabinet 110 and throughout the facility using overhead raceways (See FIGS. 2 and 4). The upper cable tray 140 is for routing copper data transmission cables from telecommunication racks (not shown in this view) in the facility and may be mounted to the horizontal support member 126 using a threaded rod 142. The upper cable tray 140 comprises a spine and upwardly bent arms or ribs (not shown in this view) which project from opposite sides of the spine and the cables. A square or rectangular opening 144 at the base of the upper cable tray 140 provides a radius drop for the copper data cables to slide through and connect to the cabinet 110. The lower cable tray 130 is a deep trough cable tray preferably made of a clear plastic material. The lower cable tray 130 may be bolted to the base of the threaded rod 142 using a cantilever support mechanism 132. A top mounted drop-out 134 connects fiber optic cables to the cabinet 110. The drop-out 134 is aligned with a cabinet cable access hole 112. In the preferred embodiment, an ADC Fiber Guide tray is used with an ADC Express Exit for the drop-out 134, although similar systems may be used as well.

Figure 2:
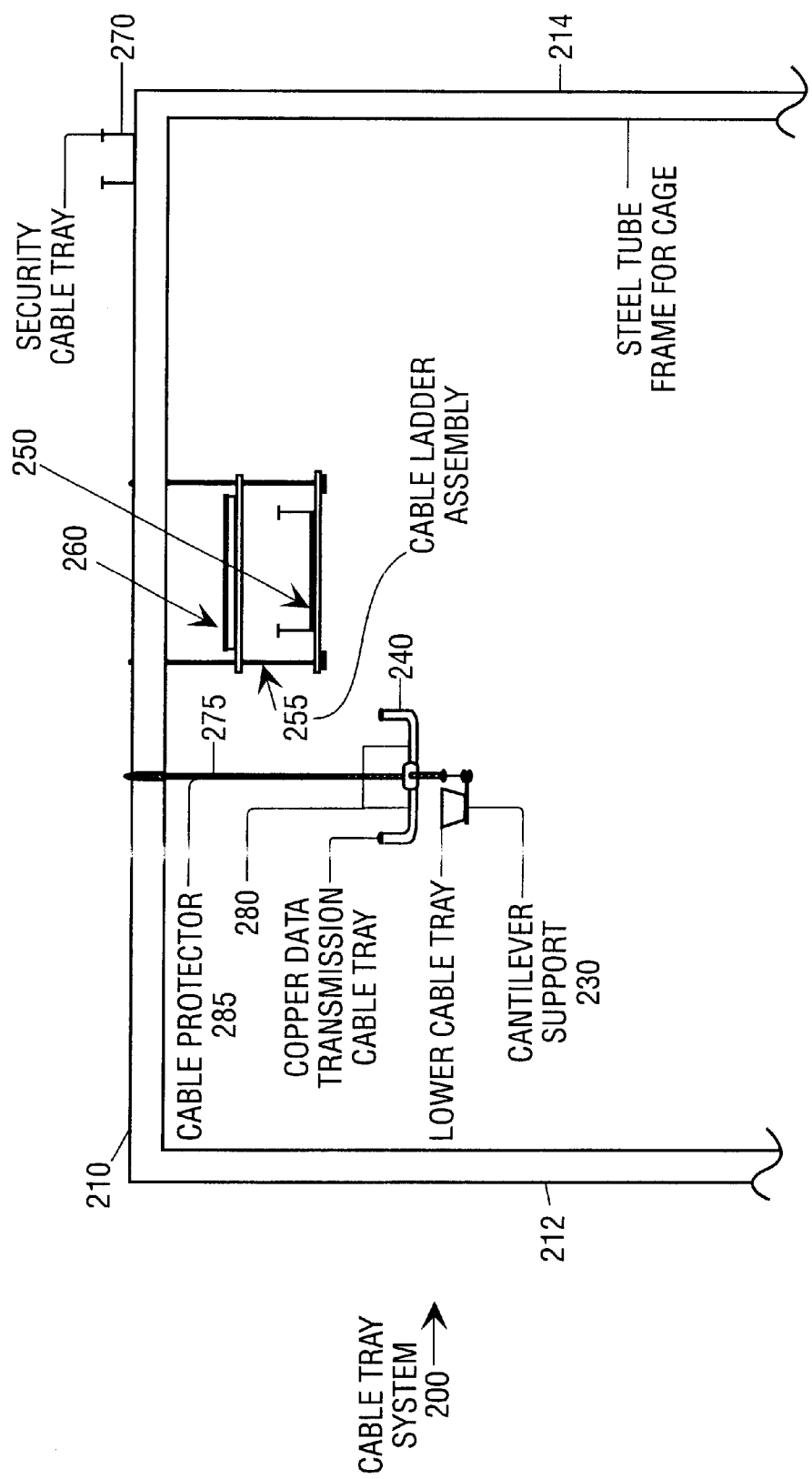
FIG. 2 is a side view of a cross-aisle section of a cable tray system in an Internet co-location facility in accordance with one embodiment of the present invention.

Referring now to FIG. 2, there is shown a side view of a cross-aisle section of a cable tray system 200 in an Internet co-location facility in accordance with one embodiment of the present invention. The cable tray system 200 is routed throughout the facility (e.g., over the aisles of the facility) using the same grid structure 210 described in the embodiment represented by FIG. 1. However, instead of surrounding one or more cabinets, the grid structure 210 is suspended from the ceiling of the facility in a trapeze configuration using multiple threaded rods (not shown in this view). Vertical support members 212 and 214 also support the grid structures used to house one or more cabinets (not shown in this view).

The cross-aisle section of the cable tray system 200 is part of the same cable tray system described in the embodiment illustrated by FIG. 1. Therefore, security cable tray 270, cable ladder assembly 255 (including DC cable tray 260 and AC cable tray 250), and data transmission cable trays 240 and 230 may be configured in the same manner as is previously described (although the dimensions of the cable trays may vary slightly). In addition, the cable trays do not have openings to connect cables to individual cabinets because cable trays simply provide the raceways to route cables cross-aisle between the cabinets and to various areas within the facility (e.g., the power distribution center, the security equipment room, etc.). Moreover, data transmission cable trays 240 and 230 are suspended from a top portion of the grid structure 210 using a threaded rod 275 rather than mounted from a horizontal support member (not shown in this view) spanning the width of the grid structure 210 (See FIG. 1). A cable protector 285 surrounds the threaded rod 275 enabling the data transmission cable trays 240 and 230 to rotate. In addition, a plexiglass, pre-formed liner 280 may rest at the base of the copper data transmission cable tray 240 to prevent individuals from reaching up and tampering with the data transmission cables.

Figure 3:
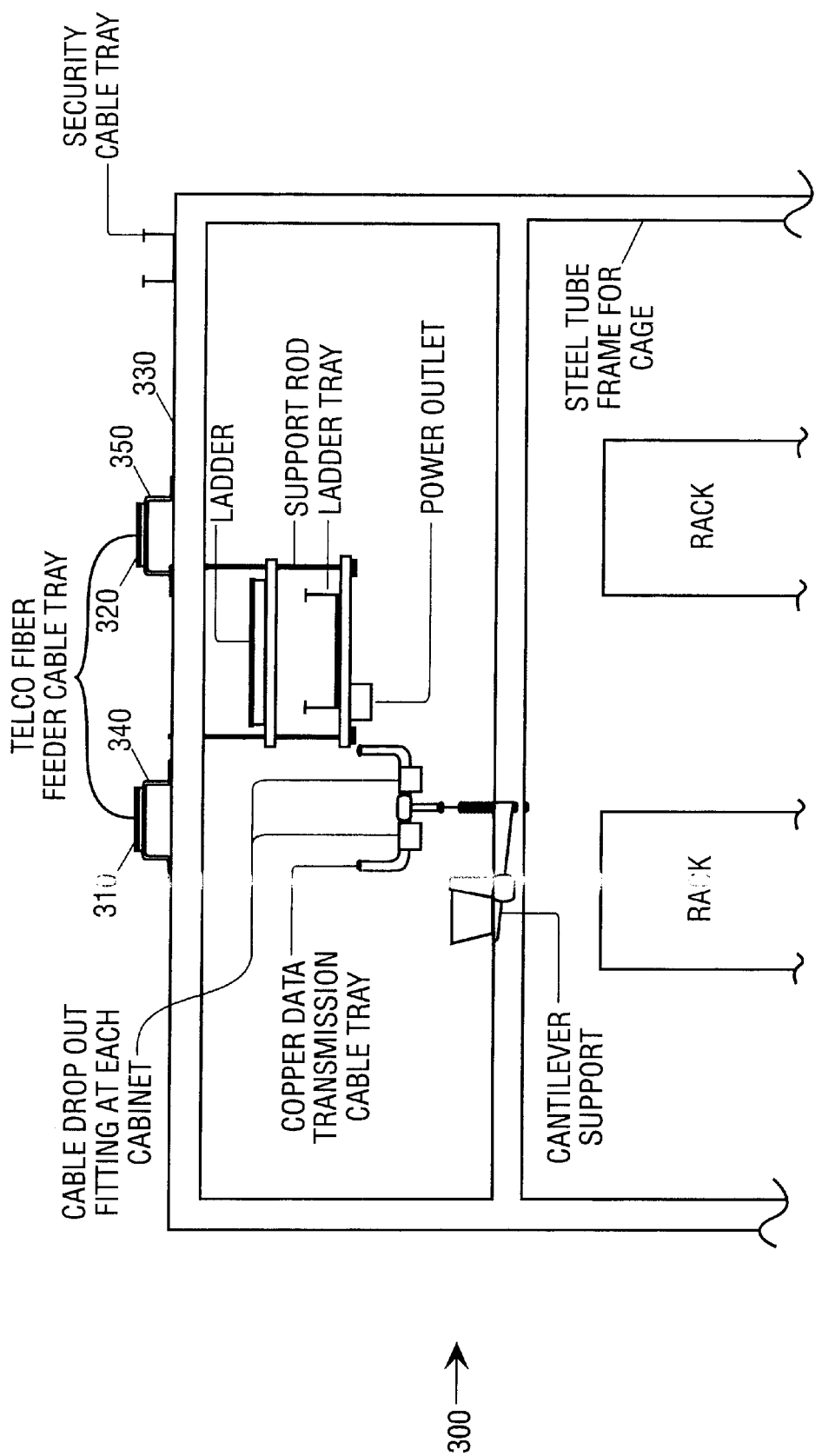
FIG. 3 is a side view of a cable tray system for one or more telecommunications racks in an Internet co-location facility in accordance with one embodiment of the present invention.

Referring now to FIG. 3, there is shown a side view of a cable tray system for one or more telecommunications racks 300 in an Internet co-location facility in accordance with one embodiment of the present invention. The cable tray system 300 is configured in the same manner as is described in the embodiment illustrated by FIG. 1. However, two additional telecommunications fiber feeder cable trays 310 and 320 mounted to a top center portion of the grid structure 330 using bent bar support frames 340 and 350 affixed to the grid structure 330 with conventional fastening techniques in a manner well known in the art. The telecommunications fiber feeder cable trays 310 and 320 are deep fiber troughs covered with a clear plastic material. The telecommunications fiber feeder cable trays 310 and 320 route fiber optics cables (not shown in this view) from the grid structure 330 to member sites (See FIGS. 2 and 4) and to telecommunications providers (e.g., AT&T, MCI Worldcom, Sprint, etc.) in the outside world.

Figure 4:
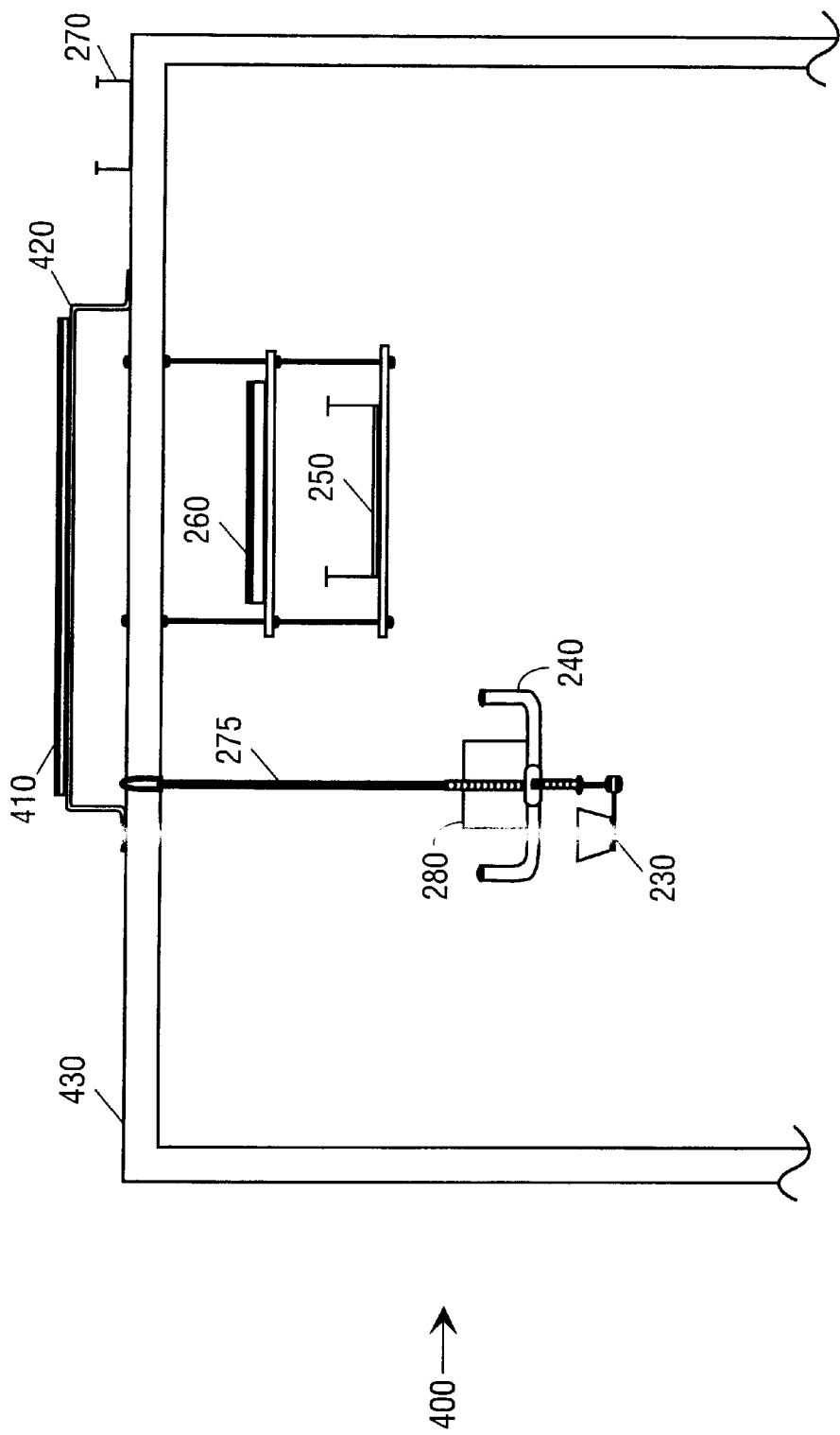
FIG. 4 is a telecommunications cross-aisle section of a cable tray system in an Internet co-location facility in accordance with one embodiment of the present invention.
Figure 4A:
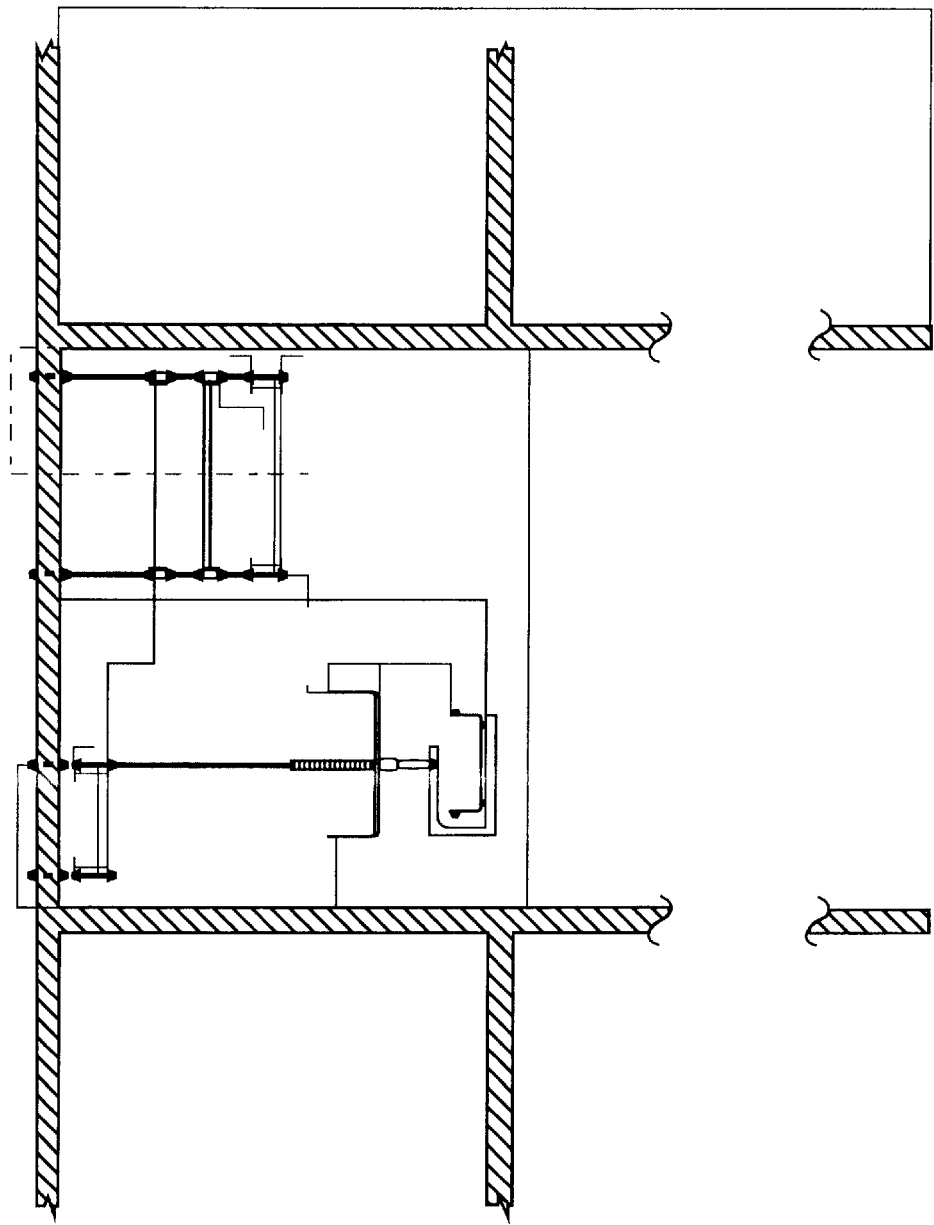
FIG. 4A is an alternative embodiment of a telecommunications cross-aisle section of the cable tray system in an Internet co-location facility shown in FIG. 4.

Referring now to FIG. 4, there is shown a telecommunications cross-aisle section of a cable tray system 400 in an Internet co-location facility in accordance with one embodiment of the present invention. The telecommunications cross-aisle section of the cable tray system 400 is configured in the same manner as is described in the embodiment illustrated by FIG. 2. However, an additional telecommunications fiber feeder cable tray 410 mounted to the top of the grid structure 430 on a bent support bar 420 attached to the grid structure 430 using conventional fastening techniques in a manner well known in the art. The telecommunications fiber feeder cable tray 410 runs cross-aisles to the grid structures that house member sites (not shown in this view) and to telecommunications providers in the outside world. FIG. 4A is an alternative embodiment of the telecommunications cross-aisle section of the cable tray system in an Internet co-location facility as shown in FIG. 4.

Referring now to FIG. 5, a security cable tray 500 is shown in greater detail in accordance with one embodiment of the present invention. Multiple security cables 510 rest in the trough 520 of the security cable tray 500 and are secured with cable ties (not shown in this view) in a manner well known to those skilled in the art of cable tray systems.

Referring now to FIG. 6, a cable ladder assembly 600 is shown in greater detail in accordance with one embodiment of the present invention. Nuts and bolts 610, 620, 630, and 640 secure an upper base plate 650 and a lower base plate 660 to threaded rod 670. DC cable tray 680 and AC cable tray 690 may be secured to base plates 650 and 660 through apertures 652, 654, etc. and 662, 664, etc. using nuts and bolts or similar fastening techniques in a manner well known to those skilled in the art. DC cables 685 and AC cables 695 may be secured to their respective trays by cable ties (not shown in this view) in a manner well known to those skilled in the art of cable tray systems.

Referring now to FIG. 7, there is shown a top view of an AC cable tray 700 (the DC cable tray may be configured in the same manner) in accordance with one embodiment of the present invention. AC cables 710 (or DC cables) rest on top of rungs 720, 730, 740, etc. spaced nine inches apart. A power outlet 760 may be affixed to the bottom of the AC cable tray 700 allowing the AC cables 710 to drop through an opening in the AC cable tray 750 to supply AC power to individual cabinets in the grid structure (not shown in this view). AC cables 710 may be secured to the rungs 720, 730, and 740 in a manner well known to those skilled in the art of cable tray systems.

Figure 8:
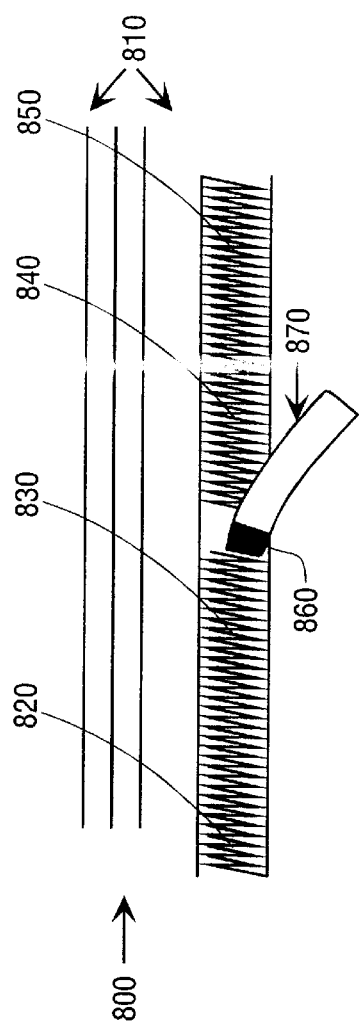
FIG. 8 is a side view of a cable tray for routing copper data transmission cables in accordance with one embodiment of the present invention.

Referring now to FIG. 8, there is shown a side view of a cable tray for routing copper data transmission cables 800 in accordance with one embodiment of the present invention. Copper data transmission cables 810 rest on upwardly bent arms (or ribs) 820, 830, 840, and 850 which project from opposite sides of the spine 860 and the cables 810. A square or rectangular opening 860 at the base of the cable tray 800 provides a radius drop 870 for the cables 810 to slide through and connect to individual cabinets 880, 885, and 890. The cables 810 may be secured to the ribs 820, 830, 840, and 850 in a manner well known to those skilled in the art of cable tray systems.

Figure 9:
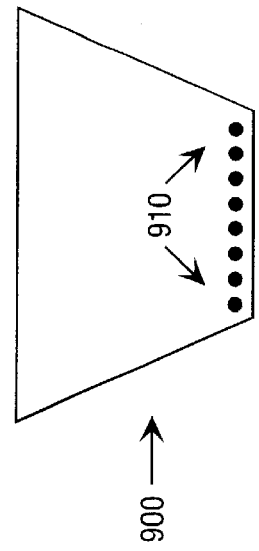
FIG. 9 is a side view of a deep trough cable tray for routing fiber optics cables in accordance with one embodiment of the present invention.

Referring now to FIG. 9, there is shown a side view of a deep trough cable tray for routing fiber optics cables 900 in accordance with one embodiment of the present invention. Fiber optics cables 910 rest in the bottom of the trough and may be secured to the cable tray 900 with cable ties (not shown in this view) in a manner well known to those skilled in the art of cable tray systems.

Figure 10:
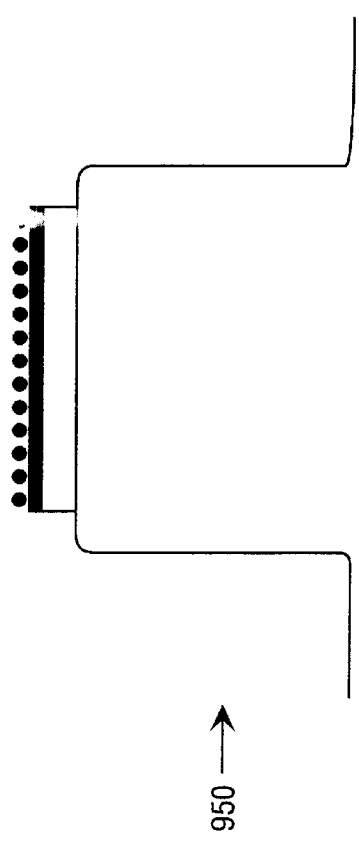
FIG. 10 is a side view of a telecommunications fiber feeder cable tray in accordance with one embodiment of the present invention.

Referring now to FIG. 10, there is shown a side view of a telecommunications fiber feeder cable tray 950 in accordance with one embodiment of the present invention. Fiber optics cables 960 rest on top of the telecommunications fiber feeder cable tray. Telecommunications fiber feeder cable tray 950 may rest on bent support bar 965 mounted to a top portion of the grid structure (not shown in this view).

Figure 11:
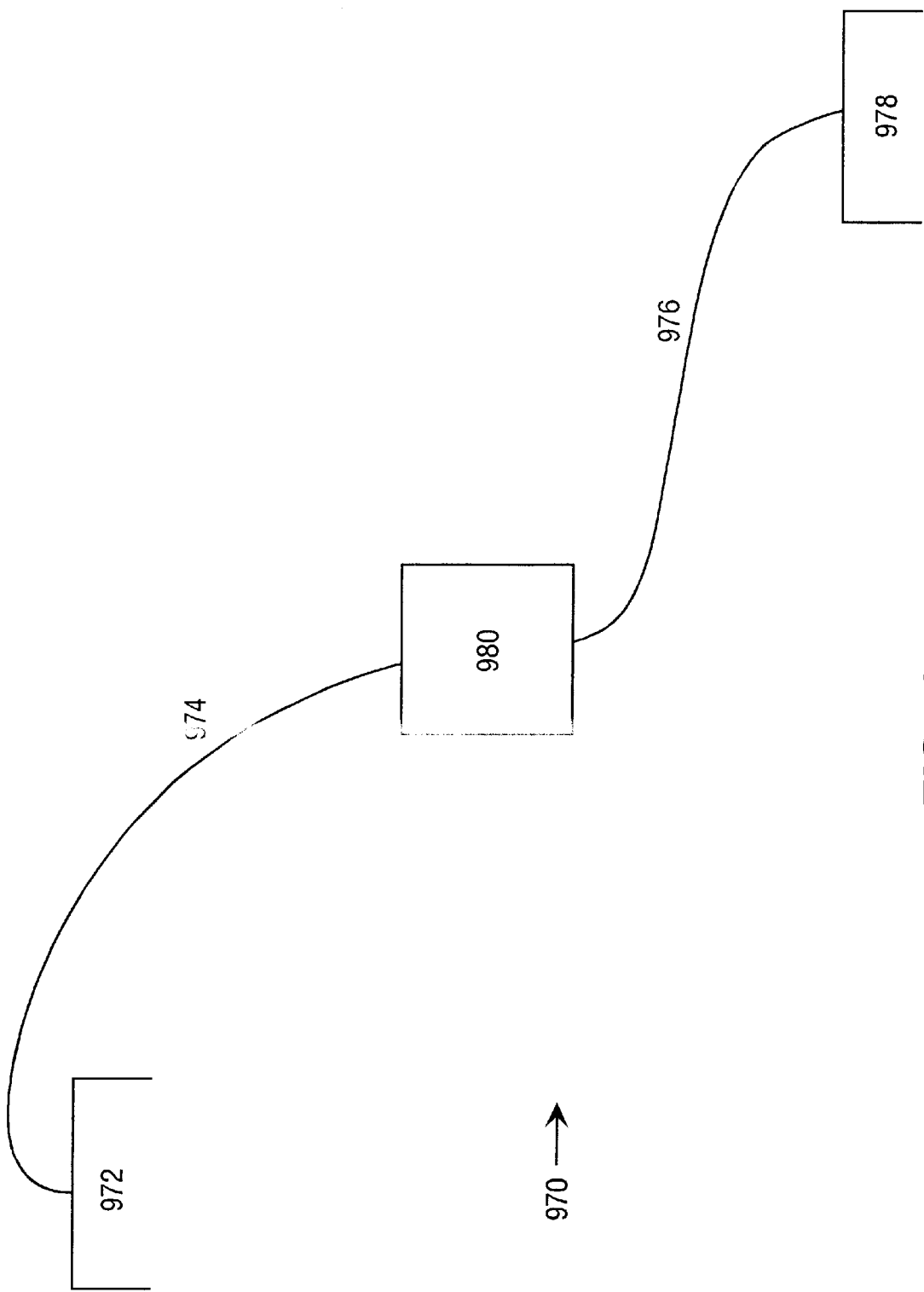
FIG. 11 is a block diagram of one member site connected to another member site using a cable tray system in an Internet co-location facility in accordance with one embodiment of the present invention.

Referring now to FIG. 11, there is shown a block diagram of one member site connected to another member site using a cable tray system 970 in an Internet co-location facility in accordance with one embodiment of the present invention. Cabinet 972 may route a cable 974 to a central switching network 980 in the Internet co-location facility. Cabinet 978 may connect to cabinet 972 through a cable 976 rather than having to route the cable 976 directly to cabinet 972 (which is often a greater distance from cabinet 978 than to the central switching network 980). Cabinet 978 may connect to multiple cabinets (not shown in this view) in this manner.

Figure 12:
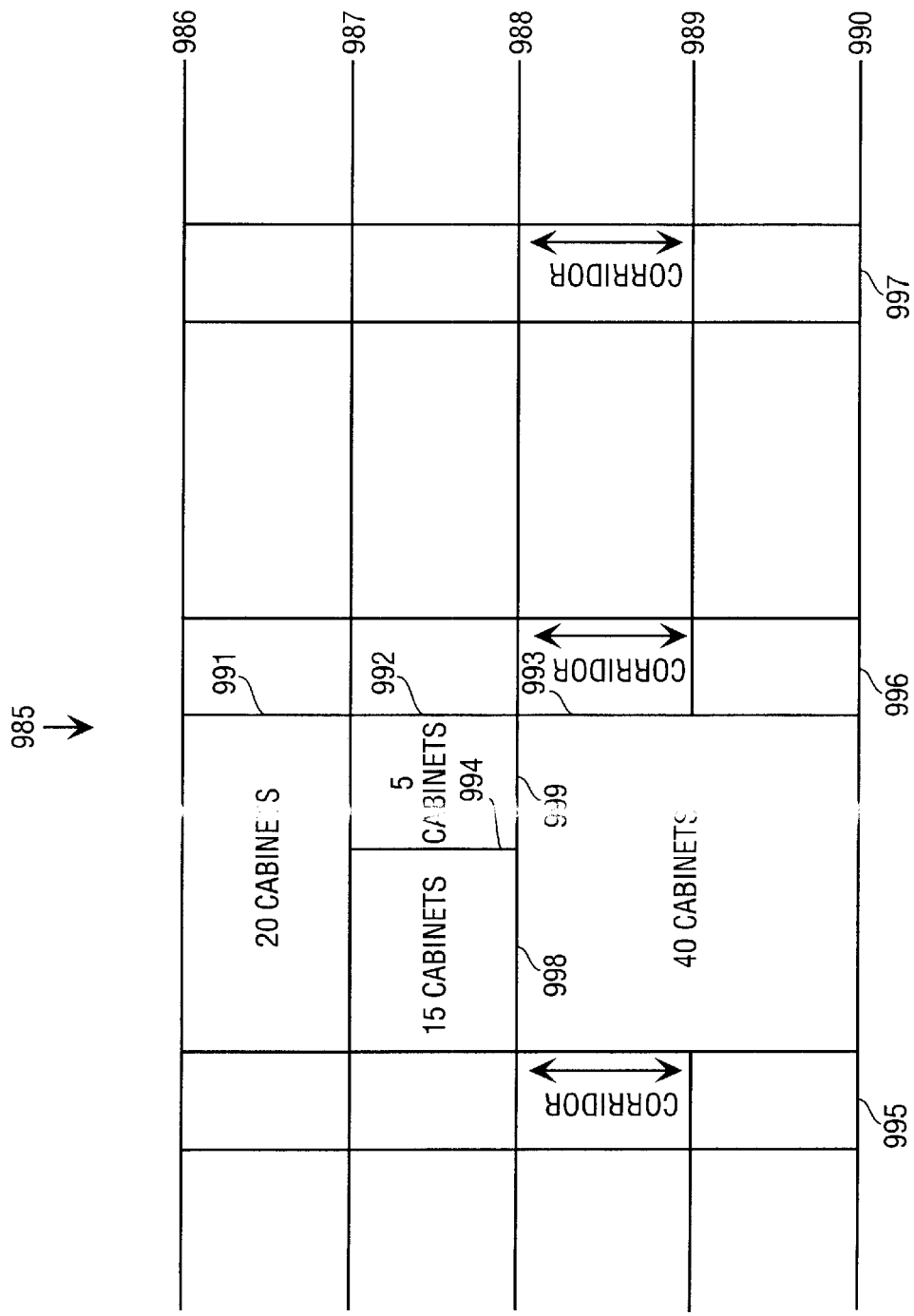
FIG. 12 is a top view of a portion of a pre-fabricated grid structure above rows of cabinets in an Internet co-location facility in accordance with one embodiment of the present invention.

Referring now to FIG. 12 there is shown a top view of a portion of a prefabricated grid structure above rows of cabinets in an Internet co-location facility 985 in accordance with one embodiment of the present invention. As described herein, the grid structure 985 is fabricated from structural steel or aluminum alloys thereof and is suspended from the ceiling of the facility in a trapeze configuration using multiple threaded rods (not shown in this view). Horizontal support members 986, 987, 988, etc., and vertical support members (not shown in this view) hold the grid structure 985 in place. The grid structure 985 spans the length and width of the co-location area of the facility and may be pre-fabricated so that it may be installed in the facility before the installation of the cabinets (not shown in this view). This allows for greater ease and flexibility in the management and installation of the cable trays in the system.

In the embodiment illustrated by FIG. 12, each cage 991, 992, 993, etc., is originally configured to contain 20 cabinets. It should be appreciated, however, that this number may vary depending on the needs of the co-located members. The cages 991, 992, 993, etc., are modular so that they may be divided or expanded. For example, cage 992 may be divided into two cages 998 and 999 by extending a support member 994 perpendicular to horizontal support members 987 and 988. The support member 994 may be interlocked with horizontal support members 987 and 988 using nuts and bolts or some other conventional fastening means in a manner well known in the art. Additional intersecting bendable metal rods may be affixed to support member 994 and vertical support members to create the two cages 998 and 999, one cage containing 15 cabinets and the other cage containing 5 cabinets. In this manner, cages 991, 992, 993, etc., may be split efficiently without reducing the total number of cabinets per square foot. In addition, cages 991, 992, 993, etc., may be expanded into larger cages by removing the horizontal support member(s) between the cages. For example, in the embodiment illustrated by FIG. 12, cage 993 has been expanded to contain 40 cabinets by removing a portion of horizontal support member 989. It should be noted that another benefit of the modular nature of the pre-fabricated grid structure 985 is that corridors 995, 996, 997, etc., are always kept clear of cabinets and/or other equipment.

Thus, a cascading cable tray system with a pre-fabricated support structure has been described. Although the foregoing description and accompanying figures discuss and illustrate specific embodiments, it should be appreciated that the present invention is to be measured only in terms of the claims that follow.

What is claimed is:

1. A cascading cable tray system, comprising:

a grid structure for suspension from an overhead ceiling of an Internet co-location facility, the grid structure comprised of metal mesh and interlocking steel tubes that form expandable and divisible cages for cabinets located in the facility; and a plurality of cable trays segregated by security, power, and data transmission functions mounted to the grid structure and occupying varying horizontal planes.

2. The overhead cable tray system of claim 1 wherein a cage is expanded by removing the interlocking steel tubes and metal mesh that serve as a barrier between the cage and one or more other cages located in the facility.

3. The overhead cable tray system of claim 1 wherein a cage is divided by adding interlocking steel tubes and metal mesh to the grid structure to create one or more barriers between cabinets located in a cage.

4. The overhead cable tray system of claim 1 wherein a security cable tray is mounted to a top portion of the grid structure, the security cable tray routing security cables between cabinets and security equipment located in a facility.

5. The overhead cable tray system of claim 4 wherein the security cables fit through an opening at the base of the security cable tray and are routed through a vertical support member of the grid structure to the cabinets.

6. The overhead cable tray system of claim 1 wherein a cable ladder assembly is suspended from a top portion of the grid structure, the cable ladder assembly comprising a DC cable tray and an AC cable tray mounted on base plates held in parallel to one another using threaded rods.

7. The overhead cable tray system of claim 6 wherein the DC cable tray routes DC cables and the AC cable tray routes AC cables between the cabinets and a power distribution center located in the facility.

8. The overhead cable tray system of claim 1 wherein an upper data transmission cable tray and a lower data transmission cable tray are mounted to a horizontal support member spanning the width of the grid structure above the cabinets.

9. The overhead cable tray system of claim 8 wherein the upper data transmission cable tray includes a radius drop to route copper data transmission cables between the cabinets and one or more telecommunications racks located in the facility.

10. The overhead cable tray system of claim 8 wherein the lower cable tray includes a top mounted drop-out to route fiber optics cables between the cabinets and one or more telecommunications racks located in the facility.

11. The overhead cable tray system of claim 1 wherein the cable trays are routed cross-aisles in the facility using raceways mounted to a top portion of the grid structure.

12. The overhead cable tray system of claim 1 wherein the cable trays may be routed to a central switching fabric located in the facility, the central switching fabric connecting co-located member sites including the cabinets and one or more telecommunications racks.

13. An overhead cable tray system, comprising:
   a grid structure for suspension from an overhead ceiling of an Internet co-location facility, the grid structure comprised of metal mesh and interlocking steel tubes that form expandable and divisible cages for telecommunications racks; and
   a plurality of cable trays segregated by security, power, and data transmission functions mounted to the grid structure and occupying varying horizontal planes.

14. The overhead cable tray system of claim 13 wherein a cage is expanded by removing the interlocking steel tubes and metal mesh that serve as a barrier between the cage and one or more other cages located in the facility.

15. The overhead cable tray system of claim 13 wherein a cage is divided by adding interlocking steel tubes and metal mesh to the grid structure to create one or more barriers between telecommunications racks located in the cage.

16. The overhead cable tray system of claim 13 wherein a security cable tray is mounted to a top portion of the grid structure, the security cable tray routing security cables between the one or more telecommunications racks and security equipment located in the facility.

17. The overhead cable tray system of claim 16 wherein the security cables fit through an opening at the base of the security cable tray and are routed through a vertical support member of the grid structure to the telecommunications racks.

18. The overhead cable tray system of claim 13 wherein a cable ladder assembly is suspended from a top portion of the grid structure, the cable ladder assembly comprising a DC cable tray and an AC cable tray mounted on base plates held in parallel to one another using threaded rods.

19. The overhead cable tray system of claim 18 wherein the DC cable tray routes DC cables and the AC cable tray routes AC cables between the one or more telecommunications racks and a power distribution center located in the facility.

20. The overhead cable tray system of claim 13 wherein an upper data transmission cable tray and a lower data transmission cable tray are mounted to a horizontal support member spanning the width of the grid structure above the one or more telecommunications racks.

21. The overhead cable tray system of claim 20 wherein the upper data transmission cable tray includes a radius drop to route copper data transmission cables between the telecommunications racks and one or more cabinets located in the facility.

22. The overhead cable tray system of claim 20 wherein the lower cable tray includes a top mounted drop-out to route fiber optics cables between the telecommunications racks and one or more cabinets located in the facility.

23. The overhead cable tray system of claim 13 wherein two telecommunications fiber feeder cable trays are mounted to a top portion of the grid structure, the telecommunications fiber feeder cable trays routing fiber optics cables from the telecommunications racks to one or more cabinets located in the facility and to telecommunications providers in the outside world.

24. The overhead cable tray system of claim 13 wherein the cable trays are routed cross-aisles in the facility using overhead raceways mounted to a top portion of the grid structure.

25. The overhead cable tray system of claim 13 wherein the cable trays may be routed to a central switching fabric located in the facility, the central switching fabric connecting co-located members sites including the telecommunications racks and one or more cabinets.

* * * * *